(12) United States Patent
Ferrer

(10) Patent No.: US 7,976,684 B2
(45) Date of Patent: Jul. 12, 2011

(54) JACKETED ULTRASOUND SYSTEM

(76) Inventor: Francisco Rivera Ferrer, Wallingford, CA (US)

( * ) Notice: Subject to any disclaimer, the term of this patent is extended or adjusted under 35 U.S.C. 154(b) by 69 days.

(21) Appl. No.: 12/536,318

(22) Filed: Aug. 5, 2009

(65) Prior Publication Data
US 2010/0032283 A1 Feb. 11, 2010

Related U.S. Application Data

(60) Provisional application No. 61/087,651, filed on Aug. 9, 2008.

(51) Int. Cl.
*B01J 19/10* (2006.01)
*B06B 1/00* (2006.01)
(52) U.S. Cl. .................. 204/157.42; 422/128
(58) Field of Classification Search ......... 204/157.41–157.42; 165/142; 422/51, 128, 205, 186, 186.06; 210/748.04; 205/637
See application file for complete search history.

(56) References Cited

U.S. PATENT DOCUMENTS

| | | | | |
|---|---|---|---|---|
| 1,997,383 A * | 4/1935 | Junkers | ............ | 374/36 |
| 2,774,653 A * | 12/1956 | Cosmetto | ............ | 422/202 |
| 3,431,188 A * | 3/1969 | Hara et al. | ............ | 204/157.83 |
| 3,896,042 A * | 7/1975 | Anderson et al. | ............ | 423/248 |
| 3,932,600 A * | 1/1976 | Gutbier et al. | ............ | 423/657 |
| 3,942,511 A * | 3/1976 | Black et al. | ............ | 205/639 |
| 3,957,483 A * | 5/1976 | Suzuki | ............ | 427/180 |
| 4,045,336 A * | 8/1977 | Isteri | ............ | 210/629 |
| 4,667,730 A * | 5/1987 | Zemp | ............ | 422/138 |
| 5,143,047 A * | 9/1992 | Lee | ............ | 126/263.05 |
| 5,176,809 A * | 1/1993 | Simuni | ............ | 204/273 |
| 5,369,979 A * | 12/1994 | Aylsworth et al. | ............ | 73/24.01 |
| 5,484,573 A * | 1/1996 | Berger et al. | ............ | 422/128 |
| 5,679,236 A * | 10/1997 | Poschl | ............ | 205/351 |
| 5,888,357 A * | 3/1999 | Mitsumori et al. | ............ | 204/157.42 |
| 6,440,385 B1 * | 8/2002 | Chaklader | ............ | 423/657 |
| 6,506,360 B1 * | 1/2003 | Andersen et al. | ............ | 423/657 |
| 6,638,493 B2 * | 10/2003 | Andersen et al. | ............ | 423/657 |
| 6,653,516 B1 * | 11/2003 | Yoshikawa et al. | ............ | 422/198 |
| 6,849,247 B1 * | 2/2005 | Wagaman et al. | ............ | 423/657 |
| 7,008,609 B2 * | 3/2006 | Watanabe et al. | ............ | 423/657 |
| 7,144,567 B2 * | 12/2006 | Andersen | ............ | 423/658.2 |
| 7,235,226 B2 * | 6/2007 | Watanabe et al. | ............ | 423/657 |
| 7,326,263 B2 * | 2/2008 | Andersen | ............ | 422/129 |
| 7,448,790 B2 * | 11/2008 | Tessien et al. | ............ | 366/114 |
| 7,534,275 B2 * | 5/2009 | Tonca | ............ | 423/648.1 |
| 7,695,709 B2 * | 4/2010 | Miki et al. | ............ | 423/657 |
| 7,749,468 B2 * | 7/2010 | Halalay | ............ | 422/186 |
| 2003/0080070 A1 * | 5/2003 | Moisy et al. | ............ | 210/748 |
| 2007/0048563 A1 | 3/2007 | Stephens | | |
| 2007/0217972 A1 | 9/2007 | Greenberg et al. | | |
| 2008/0269457 A1 * | 10/2008 | Samukawa | ............ | 528/336 |
| 2010/0000876 A1 * | 1/2010 | Kirchoff et al. | ............ | 205/637 |
| 2010/0101934 A1 * | 4/2010 | Saykally et al. | ............ | 204/157.52 |

(Continued)

OTHER PUBLICATIONS

Gutierrez, M. et al, "H Atom Reactions in the Sonolysis of Aqueous Solutions," J. Phys. Chem. 1987 (91), pp. 6687-6690.*

(Continued)

*Primary Examiner* — Keith D Hendricks
*Assistant Examiner* — Colleen M Raphael
(74) *Attorney, Agent, or Firm* — David M. Driscoll, Esq.

(57) ABSTRACT

An ultrasound system is disclosed that includes a tub, a reaction chamber, an ultrasound probe positioned within the reaction chamber, and a cooling jacket surrounding the tub for exchanging heat with the tub.

22 Claims, 2 Drawing Sheets

U.S. PATENT DOCUMENTS

2010/0206742 A1* 8/2010 Janssen et al. ............. 205/637

OTHER PUBLICATIONS

Birkin, P.R. et al, "Electrochemical evidence of H(dot) produced by ultrasound," Chem. Comm. 2001, pp. 2230-2231.*

Baranchikov, A. Y. et al, "Sonochemical synthesis of inorganic materials," Russ. Chem. Rev. 76(2) pp. 133-151 (2007).*

"Reaction of Aluminum with Water to Produce Hydrogen," v. 1, 2008, US Dept. of Energy White Paper, downloaded from http://www1.eere.energy.gov/hydrogenandfuelcells/pdfs/aluminium_water_hydrogen.pdf.*

* cited by examiner

JACKETED ULTRASOUND SYSTEM

RELATED APPLICATIONS

The present application claims benefit of U.S. Provisional Application No. 61/087,651 filed Aug. 8, 2008.

BACKGROUND OF THE INVENTION

The present invention generally relates to ultrasound devices, and more particularly, to an ultrasound reaction chamber with temperature control.

There exist known methods of producing hydrogen. One known method of producing hydrogen may include converting fossil fuels into natural gas which may produce emissions of carbon dioxide and monoxide.

Another known method may include electrolysis of water which may use a high energy power source requiring relatively large loads of electric energy.

Another known hydrogen producing methods may involve chemically reacting metal hydrides or may involve reactions between water and alkaline metals such as potassium and sodium, either of which may result in relatively powerful exothermic reactions.

Methods employing ultrasound have gained interest because ultrasound can produce an improved yield in hydrogen from water however, ultrasonic reactions can produce high temperatures and pressures.

As can be seen, there is a need for an energy efficient system and method to control temperature in an ultrasonic environment.

SUMMARY OF THE INVENTION

In one aspect of the present invention, an ultrasound system comprises a tub including a reaction chamber; an ultrasound probe positioned at least partially within the reaction chamber; and a cooling jacket disposed around the tub operable to exchange heat between the tub and the cooling jacket.

In another aspect of the present invention, a gaseous fuel generator comprises an ultrasound tub including a reaction chamber; an ultrasound dome connected to the ultrasound tub; an adjustable ultrasound probe connected to the ultrasound dome; a gas flush port connected to the ultrasound dome; and a cooling jacket circumventing the ultrasound tub.

In another aspect of the present invention, a method of generating a gaseous fuel in an ultrasonic reaction chamber comprises flushing the ultrasonic reaction chamber with nitrogen or argon gas; removing oxygen present in the reaction chamber with the argon gas; applying an ultrasonic agitation to a bath of chemical reactants; and circulating a coolant through a cooling jacket, wherein the cooling jacket surrounds the reaction chamber.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a jacketed ultrasound device that may produce, for example, hydrogen gas under an improved temperature control environment. In one exemplary use, the ultrasound device may be used as a gaseous fuel generator to produce hydrogen from water by the hydroxylation and oxidation of aluminum. By employment of the jacketed ultrasound device according to exemplary embodiments of the present invention, the temperature within a reaction chamber may be maintained above 32 degrees F. in the 35° F. to 37° F. range.

Figure 1:
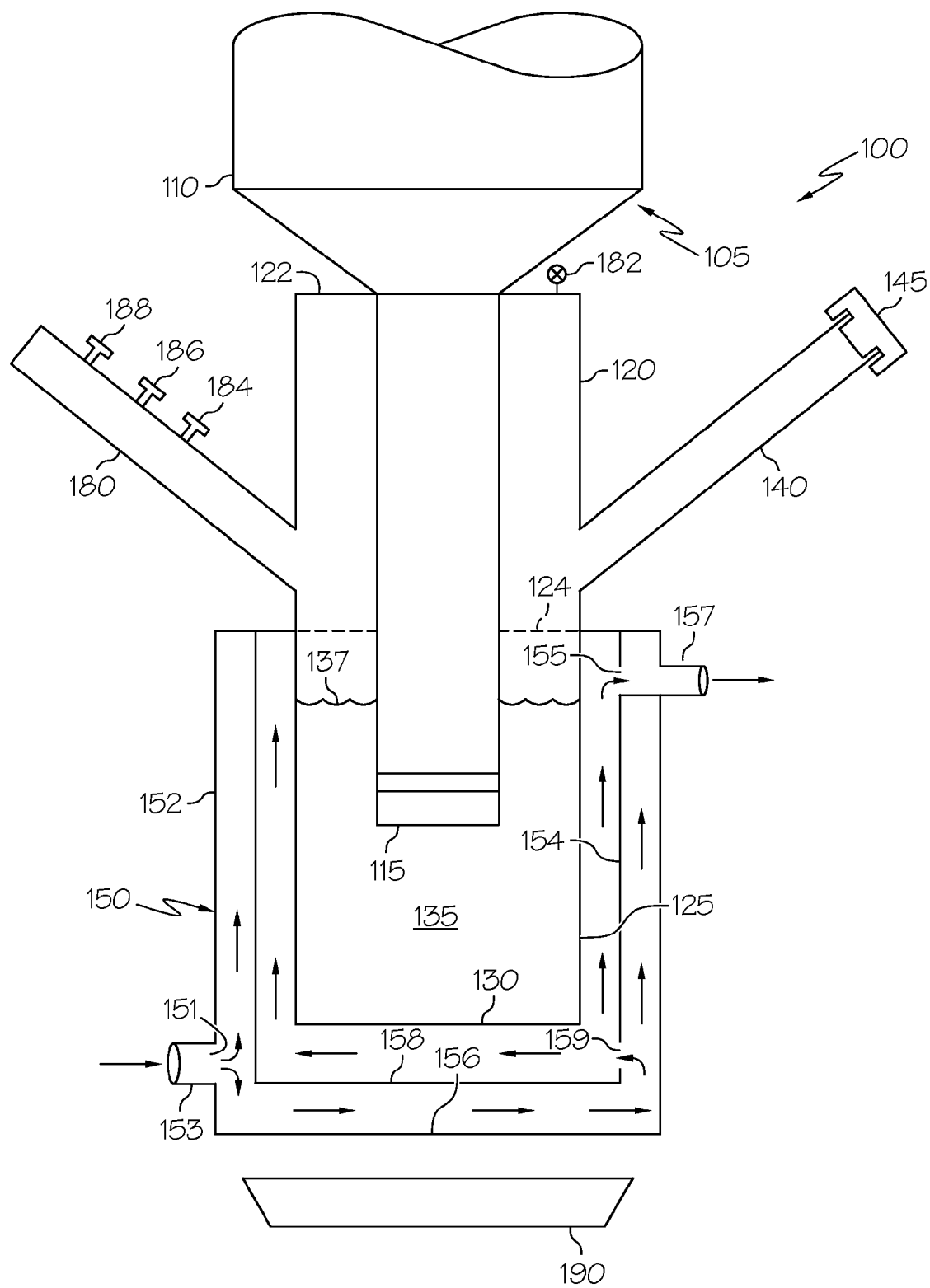
FIG. 1 depicts a cut-away front view of an ultrasound system according to an exemplary embodiment of the present invention.

Referring to FIG. 1, an ultrasound system 100 according to exemplary embodiments of the present invention is shown. The ultrasound system 100 may generally comprise a dome 120, a tub 125, ultrasound apparatus 105, and a double-walled jacket 150. In one exemplary embodiment, both the dome 120 and the tub 125 may be constructed with stainless steel or other durable materials certified to withstand pressures of 60 psi to 100 psi for use in ultrasonic applications.

The double-walled jacket 150 may be formed as two concentric walls an outer jacket wall 152 and an inner jacket wall 154 around the tub 125. The concentric disposition of the outer jacket wall 152 and the inner jacket wall 154 may define an inner flow channel 158 and an outer flow channel 156. The outer flow channel 156 may be defined by a space formed between the outer jacket wall 152 and the inner jacket wall 154. The inner flow channel 158 may be defined by a space formed between the inner jacket wall 154 and the tub 125. A fluid entrance connector 153 may be connected to the outer jacket wall 152 for permitting the introduction of a coolant into the outer flow channel 156. A fluid exit connector 157 may be connected to the outer wall jacket 152 for permitting egress of the fluid from the double-walled jacket 150. The double-walled jacket 150 may additionally include fluid ports 151, 159, and 155 for circulation of coolant through the double-walled jacket 150. The fluid port 151 may allow fluid to enter the outer flow channel 156 from the fluid entrance connector 153. The fluid port 159 may allow fluid to travel between the outer flow channel 156 and the inner flow channel 158. The fluid port 155 may allow fluid to exit from the inner flow channel 158 into and out of the fluid exit connector 157.

The dome 120 may be built according to metallurgic standards as one solid piece. The dome 120 may be composed of several parts. A piezo-electric ultrasound probe 115 may be attached to the dome 120 so that the probe 115 is centered within the dome 120 and passing through a dome lid 122. The size of the ultrasound probe 115 may vary according to a size of the tub 125. The dome 120 may also have two side ports; a flush port 140 and a gas port 180. The flush port 140 may flush the reaction chamber 135 with nitrogen or argon gas. The gas port 180 may provide a conduit for releasing produced hydrogen from the ultrasound system 100. The gas port 180 may house a temperature probe 184, a gas analyzer 186, and a pressure probe 188. The temperature probe 184 may provide temperature readings of the internal environment of ultrasound system 100. The gas analyzer 186 may provide a signal detecting the types of gasses being produced inside the ultrasound system 100. A safety blow-off valve 182 may vent gas from within the dome 120 according to a pressure exceeding a predetermined pressure level as sensed by the pressure probe 188.

The tub 125 may be hollow and include a reaction chamber 135 where a chemical reaction may take place. A sleeve 130 may line the interior of the tub 125 disposed between the inner jacket 154 and the reaction chamber 135. In on embodiment, the sleeve 130 may be made from aluminum. A sealing ring 124, such as an O-ring, may provide an hermetically sealed connection between the dome 120 and the tub 125 when the dome 120 and the tub 125 are attached to one another. It will be understood that other connections between the dome 120 and the tub 125 are contemplated such as a screw-type connection, a clamp-type connection, or a press-fit connection and that conventional locking mechanisms may be employed.

The ultrasound apparatus 105 may include an ultrasound head 110 and an ultrasound probe 115. The ultrasound apparatus may be positioned centered within and passing through the dome 120 and may extend into the tub 125 when the dome 120 and tub 125 are attached.

An induction magnetic plate 190 may be included within the ultrasound system 100 and positioned outside of the tub 125. The induction magnetic plate 190 may be connected to a power source (not shown) and when operated, may provide a magnetic field agitating contents held within the reaction chamber 135.

Figure 2:
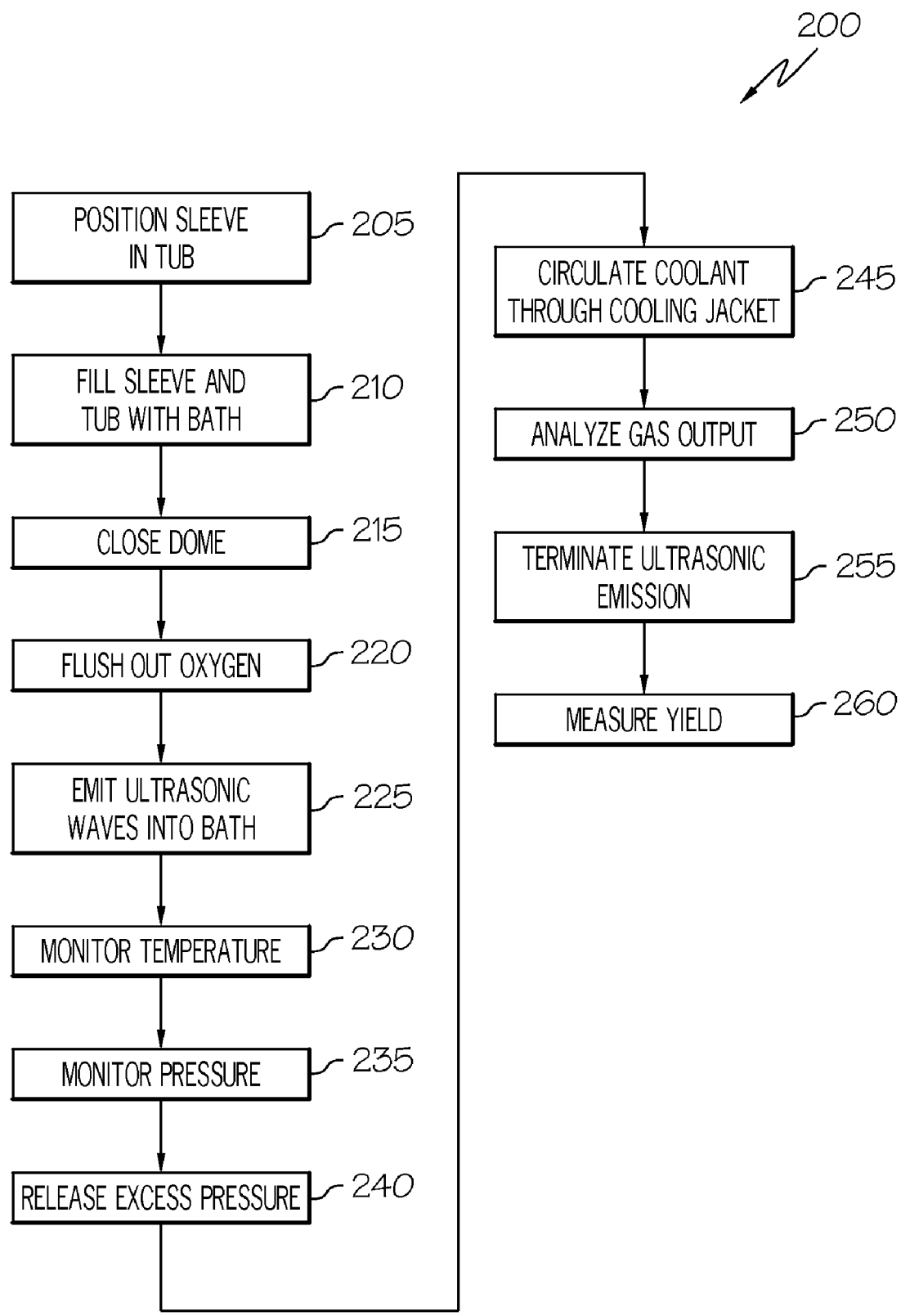
FIG. 2 illustrates a series of steps according to an exemplary embodiment of the present invention.

Referring now to FIGS. 1 and 2, in one exemplary operation, a clean sleeve 130 is positioned within the tub 125 (step 205) to hold a bath of chemical reactants 137 (step 210). In one exemplary method for producing hydrogen gas, the bath of chemical reactants 137 may comprise non-ionized distilled water, elemental aluminum, and sodium chloride may be placed into the tub 125. The amounts and ratios of each of the chemical reactants may be based on the chemical equation in mole/grams described by $$3H_2O + 2Al \qquad \text{i.}$$

where, "$H_2O$" represents the non ionized distilled water and "Al" represents aluminum, and the prefix numerals represent the number of moles for reactant. The amount in grams of sodium (NaCl) added to the reaction may be that related to the amount in grams of the two moles of aluminum, defined by an approximate ratio of 1:1. The particle size of the aluminum used may be in the range of 3.5 to 5.5 microns.

The dome 120 may be connected onto the tub 125 sealing the reaction chamber 135 from the environment (step 215). The ultrasound probe 115 may be disposed to contact the bath of chemical reactants 137 upon closing of the dome 120. It will be understood that the ultrasound apparatus may be in fixed connection to the dome 120 or may be separable and may slide into and out from the dome lid 122 so that the draft of the ultrasound probe 115 in the bath of chemical reactants 137 may be adjusted. The nitrogen or argon gas may be introduced into the ultrasound system 100 through the flush port 140 flushing oxygen from the interior of the ultrasound system 100 (step 220). The ultrasound apparatus 105 may be operated causing the ultrasound probe 115 to emit sound waves agitating the bath of chemical reactants 137 (step 225). During agitation, sonohydrosis may occur producing $OH^-$ and $H^+$ particles from the water accelerating a chemical reaction with the aluminum resulting in free gas $3H_2$ (hydrogen) and aluminum oxide ($Al_2O_3$) as well as aluminum hydroxide among other byproducts. The hydrogen gas may be drawn out of the ultrasound system 100 through the gas port 180 where the temperature probe 184 may measure the current temperature in the ultrasound system 100 (step 230), the gas analyzer 186 may analyze the constituency of gasses exiting through the port 180 (step 250), and the pressure sensor 188 may measure the current pressure in the ultrasound system 100 (step 235). Thus, one may monitor the production quantity and quality of hydrogen gas produced in the ultrasound system 100. One attribute that may need particular attention is the control of temperature in the ultrasound system 100.

Temperature within the ultrasound system 100 may need to be controlled to produce an optimum reaction for the production of hydrogen. One exemplary operation maintains a temperature within the ultrasound system 100 within an approximate range between 35° F. to 37° F. During operation of the ultrasound apparatus 105, the temperature within the reaction chamber may rise above a desired level caused by energy released from the chemical reactions as well as the heat generated by the energy of the ultrasound waves, which can cause the build-up of pressure in the ultrasound system 100.

Temperature within the ultrasound system 100 may be controlled by circulating a coolant through the double-walled jacket 150 (step 245). Coolant, such as glycol, may be introduced through the fluid entrance connector 153. The coolant may circulate through the outer flow channel 156 between the outer jacket 152 and the inner jacket 154 providing a first layer of cooling insulation. The coolant may continue to flow through the outer flow channel 156 and around the tub 125 until the coolant encounters the fluid port 159 allowing the coolant to enter the inner flow channel 158 between the inner jacket 154 and the tub 125 providing a second layer of cooling insulation. The coolant within the inner flow channel 158 may absorb heat from the tub 125 and carry the heated coolant out through fluid port 155 and out the fluid exit connector 157. It will be understood that the coolant may be circulated in any direction around the tub 125 that may be desired according to the reaction desired in the ultrasound system 100. It will also be understood that circulation of the coolant may be achieved by a pump (not shown) and re-cooling of heated coolant may be achieved by a heat exchanger (not shown) so that the coolant may be re-circulated into the double-walled jacket 150. As the temperature within the reaction chamber 135 rises or falls, the coolant flow may be adjusted until the temperature probe 184 registers a desirable temperature. Additionally, when the pressure sensor 188 detects a rise in pressure within the reaction chamber 135, the temperature within the reaction chamber 135 may also rise. Thus pressure may be released from the reaction chamber 135 (step 240) through the blow off valve 182 until the pressure sensor 188 and temperature probe 184 register acceptable levels.

It may be appreciated that NaCl may be included into the reaction to supress passivation. As aluminum reacts with oxygen or with hydroxide (—OH), its by-products inhibit further reaction to occur, therefore stopping it. To facilitate the reaction to continue two things should happen, first increasing the surface area of the aluminum by decreasing the size of the particles (3 to 5 microns) and secondly by adding a salt like NaCl. Experimentation has shown that one preferred molar ratio was 1:1 of NaCl gram weight to the gram weight of aluminum (one mole of aluminum is approximately 54 grams).

In another exemplary embodiment, the induction magnetic plate 190 may be used to augment agitation of the bath of chemical reactants 137. Ferrous material may be added to the bath of chemical reactants 137. Operation of the induction magnetic plate 190 may cause movement of the ferrous material resulting in agitation of the bath of chemical reactants 137.

As hydrogen produced by operation of the ultrasound system 100 exits via the gas port 180, the hydrogen may be delivered to a storage tank (not shown), a hydrogen compressor (not shown) or to a fuel cell (not shown). When operation of the ultrasound apparatus 105 is terminated (step 255), a hydrogen gas yield may be measured for any gas that continues to be produced after the ultrasound emission stops (step 260). The dome 120 may be disconnected from the tub 125 and contents remaining in the reaction chamber 135 may be removed by lifting the sleeve 130 out of the tub 125.

Experimentation employing exemplary embodiments demonstrates improved energy efficiency in operation of an ultrasound system 100 according to the present invention. It may be expected that passivation from the byproducts of the reaction between water and aluminum may inhibit the reaction from proceeding forward. In some cases, passivation may contribute to stopping the reaction entirely or slowing the reaction rate to a negligible level after a certain yield is achieved, once the emission of ultrasonic energy is terminated. Yet, experimentation using exemplary embodiments of the ultrasound system 100 has shown that once the reaction begins producing hydrogen, the reaction may become self sustained to the point that no further ultrasound may be needed to stimulate the reaction. The reaction may continue at a relatively slow rate compared to when the ultrasound apparatus 105 is powered yet, may be self sustainable.

The nature of the reaction may be considered a slow, process relative to some prior art processes. A reaction time of three or more hours under low energy may be expected according to exemplary embodiments of the present invention. Methods according to exemplary embodiments may prefer operating at relatively low energy levels of less than 50 Watts. Higher energy levels that approach the 50 Watt level may result in temperatures at the tip of the ultrasound reaching 5000 degrees Kelvin, which can make aluminum melt. An exemplary processing reaction may include a first phase, which may consist of a period of one hour and a half of processing at an 18-20 watt/Hr level. A second phase may include a half hour of processing at a 34 watt level setting. By this second phase, the concentration of output gas, such as hydrogen, that may be read on the gas analyzer 186 may reach a 9-10% yield concentration. At this point, the emission of ultrasound can optionally be stopped and the reaction may become self-sustainable. Otherwise, the process may continue under a third phase of processing.

What may be unexpected is that during the third phase of processing, a gas product may react over a four hour period, with yield concentrations of 80% of the gas product, such as hydrogen. This is in comparison to previously known methods that yielded 70% or less of a concentration. After the second phase, the reactants may become more viscose and a change of sound may be heard by an operator. The ultrasound system 100 may register drop in wattage. This may be due to an increase of viscosity in the chemical bath 137. Thus, in order to maintain the previous energy level, the amplitude of ultrasound waves emitted should be increased (amplitude may be the % of the ultrasound apparatus 105 total output) the watts to be maintained at this point may be in the 8 to 10 Watts range. This phase of processing may be of shorter duration (2:45 to 3:30 hours) than that of the first phase of reaction, but this phase may consume more total energy over the span of the phase. What may also be surprising is that the amount of energy to start the reaction is low in nature, 8 to 10 Watts as compared to the 18-20 Watts used during the first few hours.

Still yet, what may further be unexpected is that an 80% yield concentration may result even when the ultrasound apparatus 105 is left unpowered after the second phase. During this exemplary embodiment of operation, exemplary embodiments of the ultrasound system 100 may continue reacting without the aid of ultrasonic agitation and may overcome the effects of passivation. For example, when the ultrasound apparatus 105 is powered off after the second phase, the reaction of elements in the chemical bath 137 may continue over several hours (in other words, the duration may typically be longer than 3 hours) and yet yield, for example, an 80% yield of concentration without the need for the additional energy consumed during phase 3.

It should be understood, of course, that the foregoing relates to exemplary embodiments of the invention and that modifications may be made without departing from the spirit and scope of the invention as set forth in the following claims.

I claim:

1. A generator for producing hydrogen, comprising:
    an ultrasound system that includes to tub and dome that together define a reaction chamber that contains chemical reactants;
    an ultrasound probe coupled with the reaction chamber and that is operated to cause sonohydrolysis within the reaction chamber;
    a flush port communicating with the reaction chamber;
    a gas release port communicating with the reaction chamber;
    a cooling jacket disposed about the reaction chamber, containing a coolant and operable to exchange heat between the reaction chamber and the cooling jacket;
    the chemical reactants comprised of water, aluminum and sodium chloride;
    the ultrasound agitation accelerating the chemical reaction resulting in the generation of hydrogen and aluminum oxide with the hydrogen released from the gas release port;
    the presence of sodium chloride among the chemical reactants enabling the chemical reaction to continue.

2. The generator of claim 1 further comprising a gas analyzer connected to the gas port operable to detect gasses within the reaction chamber.

3. The generator of claim 1 wherein the cooling jacket is a double-walled jacket.

4. The generator of claim 3 wherein the cooling jacket includes an outer flow channel and an inner flow channel operable to circulate a coolant from the outer flow channel to the inner flow channel.

5. The generator of claim 1 further comprising a temperature probe operable to read a temperature within the ultrasound system.

6. The generator of claim 5 wherein the temperature probe monitors a temperature in the reaction chamber and adjusts a flow of the coolant through the cooling jacket.

7. The generator of claim 6 wherein the combination of the temperature probe and cooling jacket establish a reaction chamber temperature in an approximate range of 35.degree. F.

8. The generator of claim 7 wherein the sleeve is made of aluminum.

9. The generator of claim 8 wherein the pressure sensor is disposed at the gas release port.

10. The generator of claim 1 further comprising a sleeve lining an interior of the tub.

11. The generator of claim 1 further comprising a pressure sensor operable to detect pressure within the reaction chamber.

12. The generator of claim 1 wherein the ultrasound system operates at an energy level of less than 50 watts.

13. A method of generating hydrogen in an ultrasonic reaction chamber, said method comprising the steps of:
    providing an ultrasound system that includes a reaction chamber that contains a chemical reactant bath;

flushing any gases from the ultrasonic reaction chamber;
providing the chemical reactant bath as a mixture comprised of water, aluminum and sodium chloride;
operating the ultrasound system to emit sound waves for agitating the bath of chemical reactants;
the ultrasound agitation accelerating the chemical reaction resulting in the generation of hydrogen and aluminum oxide with the hydrogen released from a gas release port of the reaction chamber;
the presence of sodium chloride among the chemical reactants enabling the chemical reaction to continue;
circulating a coolant through a cooling jacket that surrounds the reaction chamber;
monitoring the temperature of the hydrogen released through the gas release port, and, in turn, adjusting a flow of the coolant through the cooling jacket; and
measuring the yield a hydrogen from the reaction chamber.

14. The method of claim 13 further providing a gas analyzer connected to the gas port operable to detect gasses within the reaction chamber.

15. The method of claim 13 wherein the cooling jacket is a double-walled jacket.

16. The method of claim 15 including providing the cooling jacket with an outer flow channel and an inner flow channel operable to circulate a coolant from the outer how channel to the inner flow channel.

17. The method of claim 13 including measuring a temperature within the ultrasound system.

18. The method of claim 17 including measuring the temperature in the reaction chamber and adjusting a flow of the coolant through the cooling jacket.

19. The method of claim 18 wherein the combination of the temperature and measurement establish a reaction chamber temperature in an approximate range of 35.degree. F. to 37.degree. F.

20. The method of claim 13 including providing a pressure sensor operable to detect pressure within the reaction chamber.

21. The method of claim 20 including providing the pressure sensor at the gas release port.

22. The method of claim 13 including operating the ultrasound system at an energy level of less than 50 watts.

* * * * *